Figure 1:
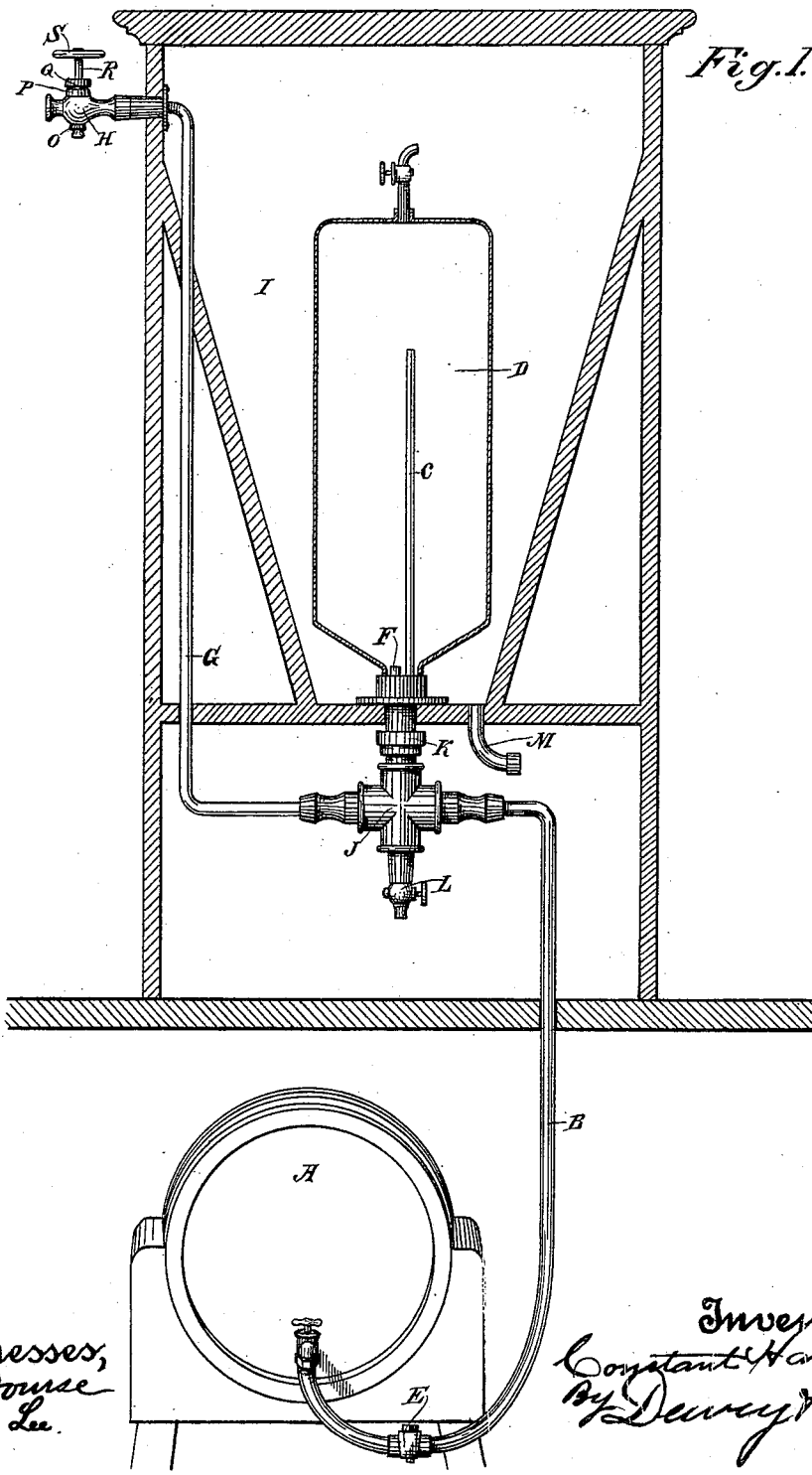

(No Model.)  2 Sheets—Sheet 1.

C. HARTH.
DEVICE FOR DRAWING STEAM BEER.

No. 449,853. Patented Apr. 7, 1891.

(No Model.) 2 Sheets—Sheet 2.

C. HARTH.
DEVICE FOR DRAWING STEAM BEER.

No. 449,853. Patented Apr. 7, 1891.

Witnesses,
J. A. Krouse
H. C. Lee

Inventor,
Constant Harth
By Dewey & Co.
Attys

UNITED STATES PATENT OFFICE.

CONSTANT HARTH, OF WILLOWS, CALIFORNIA.

DEVICE FOR DRAWING STEAM-BEER.

SPECIFICATION forming part of Letters Patent No. 449,853, dated April 7, 1891.

Application filed October 2, 1890. Serial No. 366,890. (No model.)

*To all whom it may concern:*

Be it known that I, CONSTANT HARTH, a citizen of the United States, residing at Willows, Colusa county, State of California, have invented an Improvement in Devices for Drawing Steam-Beer; and I hereby declare the following to be a full, clear, and exact description of the same.

My invention relates to a device or apparatus for drawing beer under a heavy head or pressure of gas. This class of fresh beer is known as "steam-beer," in distinction from lager and other kinds, which take longer in making and have not so great a pressure of gas in them. This beer is usually made and placed in casks of various sizes, which are delivered to the places where the beer is to be sold by the glass, and the beer is drawn directly from the cask. The pressure of the gas is so great, however, that it it is almost impossible to draw the beer without allowing some of the gas to escape, and after the cask is more than half-empty there is not pressure enough of gas to keep the beer in a sufficiently lively condition.

My invention consists in the interposition of a chamber or receiver between the cask and the drawing-off faucet and in a means for conveying the beer from the cask to this chamber and from the chamber to a peculiarly-constructed drawing-off faucet which is used in connection therewith.

Figure 2:
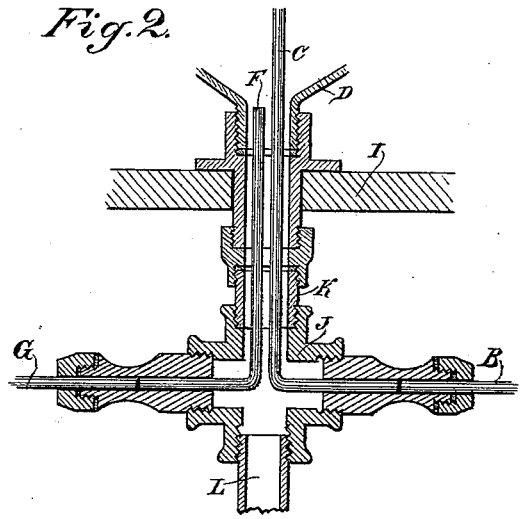
Figure 3:
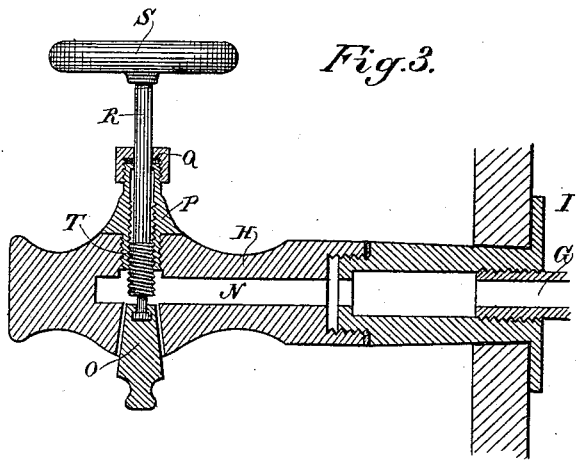

Referring to the accompanying drawings for a more complete explanation of my invention, Figure 1 is a general view showing the cask, a sectional view of the intermediate receiver, and a containing refrigerating-chamber. Fig. 2 is an enlarged view of the pipes leading to and from the intermediate receiver. Fig. 3 is an enlarged section of the drawing-off faucet.

A is a cask into which the beer is placed at the brewery, said cask being delivered to the point where it is to be used and placed in a cellar or basement or other convenient place. By means of a cock or faucet or other suitable connection and a flexible pipe B, connected with this cock, the beer is forced by the pressure of gas within the cask through this flexible pipe, and thence through a delivery-pipe C, which extends upwardly into the intermediate chamber or receptacle D. This chamber may be made of any suitable size, shape, or material. In the present case I have shown it as a stout metal receiver similar to those used in connection with what are known as "soda-fountains," and the beer being forced from the cask through the flexible tube B and pipe C, which extends to nearly the upper part of the receiver D, is delivered into the receiver by the pressure from the cask.

E is a check-valve situated near the cask, which prevents any return of the beer into the cask if the pressure therein should be lessened.

F is a discharge-pipe leading from the receiver D and connecting with a pipe G by a suitable coupling. The pipe G extends to any suitable or convenient point where the drawing-off faucet H is fixed.

In the present case I have shown the receiver D as situated within an exterior case I, which is adapted to contain ice surrounding the receiver, and in this manner the beer is always kept in a perfectly cool condition.

The pipes C and F lead into a coupling J, which is of sufficient size to contain them, and both of them are bent upwardly, passing through the connections K, which are intermediate between the coupling and the receiver D, so that these couplings and connections are all formed in a single structure with a passage around the outside of the pipes F and C sufficiently large to allow the contents of D to be drawn off whenever desired through a waste or cleaning cock L, which is situated at the bottom of the coupling J. When this cock is opened, the others being closed, the contents of the receiver D may be drawn off and the receiver properly cleaned at any time. By means of the pipe M any accumulation of water in the refrigerating-chamber I may also be drawn off in the same manner. A pipe and cock are fitted to the top of the receiver, and through these any surplus air or gas may be withdrawn.

The receiving-chamber, the refrigerating-chamber, and connecting-pipes are all contained within any suitable ornamental exterior box or structure, and the pipe leading from the cask may pass up through the floor and the bottom of this structure, while the drawing-off pipe or faucet H projects through the side of the case or structure at any suitable or convenient point. By this construction the pressure of the gas in the upper part of the cask A will gradually transfer the beer through the pipe B into the receiver D, where it will remain under a pressure corresponding with that in the cask A; but the beer itself will be in what is known as a "solid" condition, with not so much foam and gas mixed in with it as will be found in the cask.

The draw-off faucet H has a passage N extending through it and connecting with the pipe G, and a tapering plug O is fitted into a correspondingly-shaped tapering passage at right angles with the passage N and connecting with it, this passage leading downward from the passage N. Upon the upper side of the faucet H and in line with the tapering plug O is the nut P, which is screwed into the opening, and the upper part forms a stuffing-box having a suitable packing, as shown at Q, to prevent any escape in this direction. Through this stuffing-box and the screw-cap P the stem R passes, having a hand-wheel or other suitable means S by which it may be turned. This stem R is screw-threaded, as shown at T, where it passes through the lower part of the cap T, and the lower end is connected by a swivel with the plug O, so that it may turn round loosely within the plug, while the action of the screw-threads at T will either draw the plug up, so as to close the tapering opening within which the plug is situated, or force the plug down, so as to allow the beer to escape around the sides of the plug.

There is no hole through the plug O and no connection between the passage N and the outside except such opening as may be made around the plug O by forcing it downward within this tapering chamber, the size of the space around the plug depending on the distance that the plug is forced downward by the screw-stem which operates it.

By this construction I am enabled to draw the beer very rapidly from the cask and in what is known as a "solid" condition, with but very little foam showing in the glass, and the amount of foam and gas can be accurately regulated by the peculiar faucet through which the beer is drawn off.

Having thus described my invention, what I claim as new, and desire to secure by Letters Patent, is—

1. The combination of the cask within which the beer is contained, an intermediate receiver, a pipe leading from the cask to the receiver and a second pipe leading from the receiver to the draw-off faucet, and a coupling having a draw-off passage through which the pipes extend, substantially as herein described.

2. A device for drawing steam-beer, consisting of the cask within which the beer under pressure is contained, an intermediate receiver having the connection and coupling extending downwardly from the bottom, a pipe leading from the cask and connecting with a pipe which passes through said coupling and terminates in the upper part of the receiver, a second pipe opening into the lower part of the receiver and leading out through the coupling connecting with the draw-off faucet, a check-valve situated between the cask and the receiver to prevent the return of beer into the cask, and a cock or faucet connecting with the lower end of the coupling through which the pipes pass, whereby the receiver may be discharged directly through said faucet, substantially as herein described.

In witness whereof I have hereunto set my hand.

CONSTANT HARTH.

Witnesses:
  SETH MILLINGTON,
  H. M. DUNCAN.